(12) United States Patent
Belmonte et al.

(10) Patent No.: US 8,834,124 B2
(45) Date of Patent: Sep. 16, 2014

(54) DEVICE FOR ATTACHING HAMMER CLAMP BLADES, ASSOCIATED COMPRESSOR HUB, COMPRESSOR AND TURBINE ENGINE

(75) Inventors: Olivier Belmonte, Perthes en Gatinais (FR); Franck Emmanuel Bosco, Saint Genevieve des Bois (FR)

(73) Assignee: SNECMA, Paris (FR)

( * ) Notice: Subject to any disclaimer, the term of this patent is extended or adjusted under 35 U.S.C. 154(b) by 626 days.

(21) Appl. No.: 13/141,586

(22) PCT Filed: Dec. 1, 2009

(86) PCT No.: PCT/EP2009/066177
§ 371 (c)(1),
(2), (4) Date: Jun. 22, 2011

(87) PCT Pub. No.: WO2010/072522
PCT Pub. Date: Jul. 1, 2010

(65) Prior Publication Data
US 2011/0255983 A1 Oct. 20, 2011

(30) Foreign Application Priority Data
Dec. 23, 2008 (FR) ...................................... 08 59009

(51) Int. Cl.
*F01D 5/30* (2006.01)
*F01D 5/32* (2006.01)

(52) U.S. Cl.
CPC .............. *F01D 5/3038* (2013.01); *F01D 5/32* (2013.01); *Y02T 50/673* (2013.01)
USPC ...................................... 416/217; 416/220 R

(58) Field of Classification Search
USPC ....... 416/204 A, 207, 215, 217, 219 R, 220 R
See application file for complete search history.

(56) References Cited

U.S. PATENT DOCUMENTS

| 4,859,149 A | * | 8/1989 | McClain | ........................ 416/215 |
| 6,752,598 B2 | * | 6/2004 | Antunes et al. | ............... 416/215 |
| 2006/0083621 A1 | * | 4/2006 | Klingels | ........................ 416/215 |

FOREIGN PATENT DOCUMENTS

| EP | 1 650 405 | 4/2006 |
| FR | 741 284 | 2/1933 |
| GB | 12 015 | 8/1910 |
| GB | 154 599 | 4/1921 |
| SU | 480849 | 8/1975 |

OTHER PUBLICATIONS

International Search Report Issued Feb. 9, 2010 in PCT/EP09/066177 filed Dec. 1, 2009.

* cited by examiner

*Primary Examiner* — Ned Landrum
*Assistant Examiner* — Woody A Lee, Jr.
(74) *Attorney, Agent, or Firm* — Oblon, Spivak, McClelland, Maier & Neustadt, L.L.P.

(57) ABSTRACT

A locking device for enabling the circular locking of a set of blades provided with a hammer base on the rim of a turbine engine compressor hub is disclosed. The rim includes a peripheral groove on the outer surface thereof for receiving the bases of the blades of the set and two shoulders framing the groove with surfaces which form bearings for holding the blades; and a cut-out provided in at least one of the shoulders to enable the bases of the blades to be inserted in the groove. The locking device translatably immobilizes the blades in the groove and is positioned in the groove between two consecutive blades and in turn translatably held in the groove by an attachment device. A carrier is shaped so as to fit into the cut-out and to rest circumferentially on at least one engagement surface of the shoulder.

13 Claims, 3 Drawing Sheets

DEVICE FOR ATTACHING HAMMER CLAMP BLADES, ASSOCIATED COMPRESSOR HUB, COMPRESSOR AND TURBINE ENGINE

BACKGROUND OF THE INVENTION

1. Field of the Invention

The field of the present invention is that of turbine engines and, more particularly, that of devices for holding compressor blades for said turbine engines.

2. Description of the Related Art

Turbine engines generally comprise one or more compressors designed to compress the air drawn into the air inlet, before its introduction into the combustion chamber where it is used to burn the injected fuel and to provide the desired propulsion. The compressor blades are essentially of two types as regards their manner of attachment to the corresponding hub. Some blades have a so-called shank fastener, i.e. they are held on the hub by a part which is inserted in a housing provided to this end; others have a hammer-type fastener, i.e. the shape of the root of the blade is flared, forming a bulb shape which is slid into a circumferential peripheral groove recessed in the external face of the rim of the hub. In this latter case, said rim has a recessed, semi-circular cross section, surmounted by two shoulders, of which the internal face has a support surface, commonly denoted the bearing surface, which is used to hold the blade when centrifugal force is applied.

The blades are successively inserted by their roots into said peripheral groove, or fastener, until it is completely filled. To engage the blades in the peripheral groove an insertion notch is formed in the lateral shoulders through which the bulb-shaped ends of the roots of the blades may pass. A locking device is provided to hold the last blade(s) introduced, which is(are) located opposite this notch, and to prevent them from coming out again. This device generally also has the function of retaining the set of blades in circular rotation and preventing them from being driven by the action of aerodynamic forces which are exerted thereon. To the side of these notches for the insertion of the blades are generally located one or two notches for the insertion of the locks, which make it possible to insert the lock(s) into the peripheral groove for locking the blades in a circular fashion.

Said locks generally comprise, as disclosed in the patent FR 28101366 of the applicant, a part which bears against the base of the peripheral groove and on the platforms of the last blades introduced to provide the locking thereof in circular translation, and a clamping means, such as a screw, which is accessible from the outside of the groove. To this end, a cutout is generally formed in the platform of the last blades introduced, so as to obtain access for the clamping tool. As a result, at least two blades of the compressor, and more generally four when a lock is arranged on each side of the notch for the insertion of the blades, are different from the other blades of the compressor stage.

The drawbacks associated with this configuration are, firstly, that the interchangeability of the blades is hindered, with the result that two reference points have to be dealt with and, secondly, the requirement of making at least two notches in the shoulders of the peripheral groove, one for the notch for the insertion of the blades and one, or even two, for the notch(es) for the insertion of the locks. Many more milling operations have to be carried out, therefore, and associated therewith, there is the additional risk of the rejection of parts in the event of poorly executed milling operations, which are particularly awkward to carry out.

The patent application EP 1650405 is also known, said patent application disclosing a system for immobilizing the blades in translation in the groove of the hub, using a system of bolts which pass through the groove and are fixed to the radial extensions of the shoulders of the hub. The number of bolts required in this configuration is particularly high and the system for immobilization is held via drilled holes in the shoulders of the hub.

BRIEF SUMMARY OF THE INVENTION

The object of the present invention is to remedy these drawbacks by proposing a system for attaching blades which does not have some of the drawbacks of the prior art and, in particular, permits the locking of hammer clamp blades of a compressor stage without hindering the interchangeability of said blades. It also enables only one milling operation to be carried out on the shoulders of the compressor hub for the introduction of the blades and eliminates those operations which have been necessary for the introduction of the associated lock(s).

To this end, the subject of the invention is a locking device designed to permit the locking, in a circular fashion, of a set of blades provided with a hammer-type root, on the rim of a turbine engine compressor hub, said rim comprising a peripheral groove on the outer face thereof designed to receive the roots of the blades of said set and two shoulders surrounding said groove of which the faces form bearing surfaces for holding said blades, said rim further comprising a cutout formed in at least one of said shoulders to enable the roots of the blades to be inserted in said groove, said device comprising a means for immobilizing the blades in translation in said groove, capable of being positioned in said groove between two consecutive blades and in turn held in translation in said groove by a support on which it is able to be assembled by means of a fixing means. The invention is characterized in that said support is shaped so as to fit in said cutout and to bear circumferentially on at least one cooperating surface of said shoulder.

With such a configuration, the blades are immobilized in translation in the groove by means of a simple device, which only comprises three elements and which only requires a single cutout of one of the shoulders of the hub, without drilled holes for the passage of the means for immobilizing the blades. Preferably, said means for immobilizing is shaped so as not to interfere with the blades during the mounting thereof, so that the set of blades may be made up of identical blades.

As the platforms of the blades are not tampered with, it is not possible to differentiate between the blades and a single design is possible for all the blades of the same set.

Preferably, the support is shaped to be inserted into the cutout in a direction substantially parallel to the axis of the turbine engine.

In a particular embodiment, the shape of the support is entirely the shape of the cutout formed in the open shoulder. Thus the correct equilibrium of the compressor hub is ensured.

Advantageously, said means for immobilizing in translation comprises an upper block capable of being positioned between the roots of two consecutive blades to retain them in translation in the groove and a base capable of being positioned at the bottom of the groove under the roots of said blades. The means for immobilizing thus ensures, by its upper block, the function of immobilizing the blades in circular translation, whilst it is in turn retained when centrifugal force is applied, by the roots of the blades which immobilize the base.

Preferably, the upper block has substantially the shape of a parallelepiped comprising two walls oriented parallel to the axis of the turbine engine and capable of cooperating with the corresponding faces of the root of the blades to be retained.

In one particular embodiment, the base comprises at least two segments extending tangentially to the groove on both sides of the lower part of the upper block.

Preferably, the upper block comprises a first drilled hole and the support comprises a second drilled hole, the two drilled holes being oriented so as to be aligned when the locking device is in position on the hub.

Preferably, the fixing means is a bolt passing through the two drilled holes and in which the support has a bearing face perpendicular to the axis of said bolt.

The invention also relates to a compressor hub for a turbine engine, designed to carry a set of blades provided with a hammer-type root, the rim of said hub comprising a peripheral groove on the outer face thereof designed to receive the roots of the blades of said set and two shoulders surrounding said groove of which the faces form bearing surfaces for holding said blades, said rim further comprising a cutout formed in at least one of said shoulders to enable the roots of the blades to be inserted in said groove, characterized in that said cutout is shaped to receive the support for holding the means for immobilizing the blades of a locking device as disclosed above, and in that said shoulder comprises a cooperating surface for the circumferential bearing of said support.

The invention further relates to a compressor of a turbine engine comprising at least one hub as disclosed above in addition to a compressor of a turbine engine provided with a set of blades provided with a hammer-type root, and a locking device as disclosed above. The invention finally relates to a turbine engine comprising such a compressor.

BRIEF DESCRIPTION OF THE SEVERAL VIEWS OF THE DRAWINGS

The invention will be more clearly understood and further objects, details, features and advantages thereof will appear more clearly during the detailed explanatory description which follows of an embodiment of the invention given merely by way of illustrative and non-limiting example, with reference to the accompanying schematic drawings, in which.

DETAILED DESCRIPTION OF THE INVENTION

Figure 1:
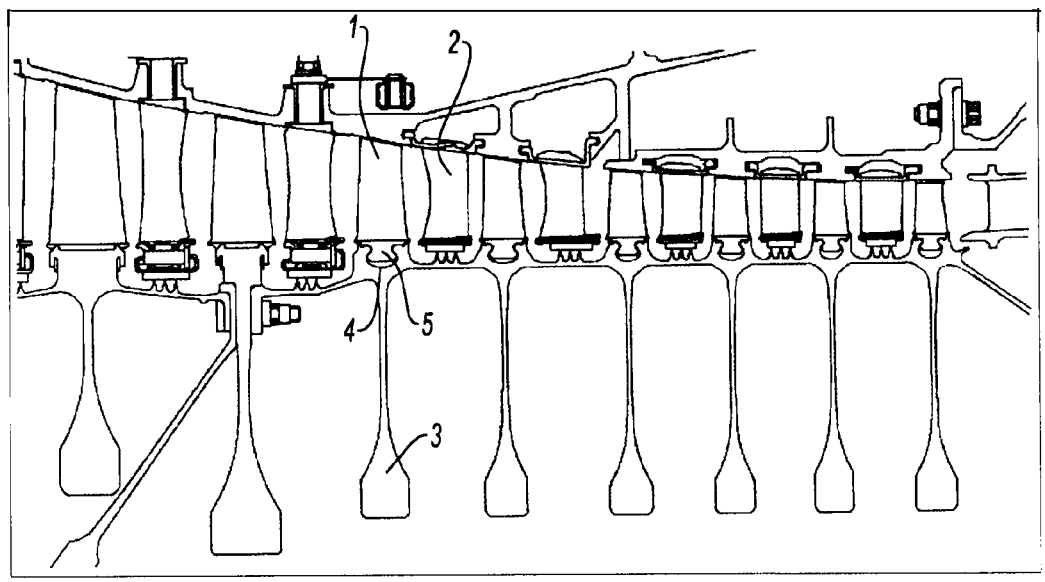
FIG. 1 is a view in longitudinal section of a turbine engine compressor, comprising blades with shank fasteners and blades with hammer-type fasteners.

With reference to FIG. 1, a compressor of a turbine engine comprising a succession of stages consisting of alternate mobile blades 1 and fixed blades 2 is seen in section. The mobile blades 1 are carried by the rims of the compressor hubs 3. The blades of the two first stages located to the left in the figure are fixed by broaching whilst the blades of the subsequent stages are slid, using a hammer-type fastener system, into a peripheral groove 4 recessed in the external face of the rim (Note: in the entirety of the description the reference "external" is understood as the part which is the most remote radially from the axis of rotation of the turbine engine).

Figure 2:
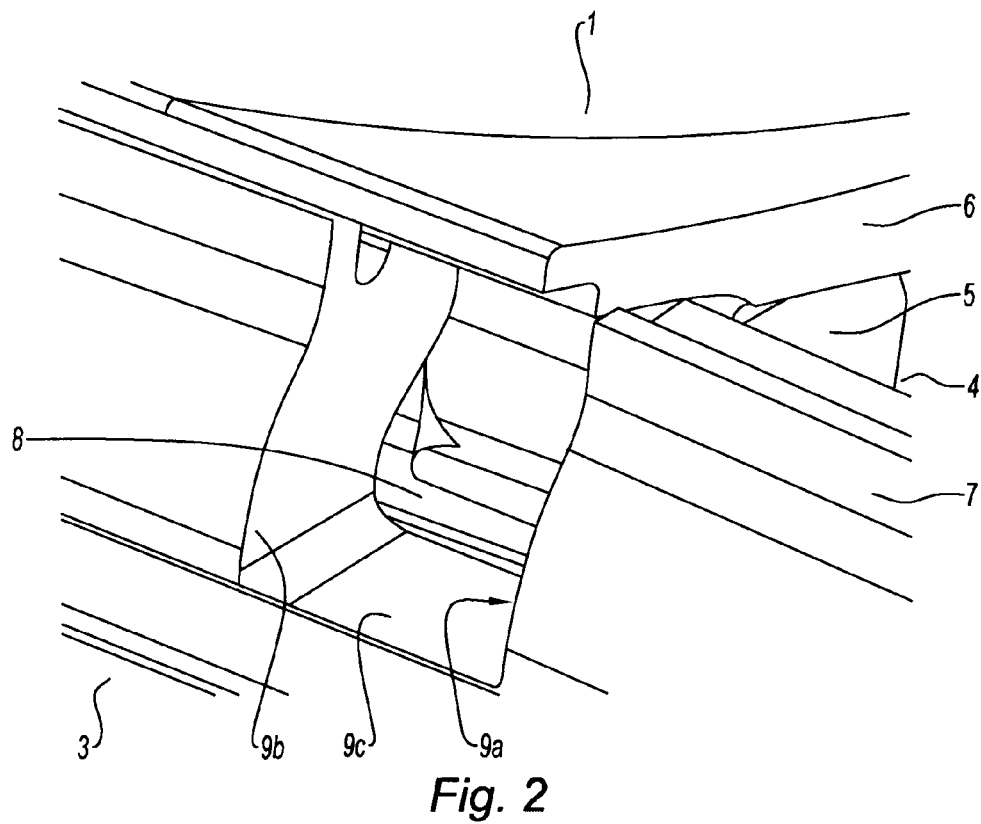
FIG. 2 is a view in perspective of a cutout of a shoulder provided with a device for locking the blades in circular translation according to an embodiment of the invention, the hub being the support of a blade.

With reference to FIG. 2, the external face of the rim of a compressor hub 3 is seen, recessed from a peripheral groove 4 in which the root 5 of a blade 1 is slid. The peripheral groove 4 in the region of the blade is entirely covered by the platform 6 thereof. The rim of the hub 3 has two shoulders of which one, the open shoulder 7, has a cutout 8 opening onto the external face of the rim, through which the root 5 of the blade is able to pass. This cutout constitutes the aperture for the insertion of the blades, through which all the blades 1 pass when fitted in the groove 4. The cutout 8 is limited, on the circumference of the hub, by two parallel faces 9a and 9b extending parallel to the axis of rotation of the hub 3; the cutout is limited radially by a planar shape, also parallel to this axis of rotation but perpendicular to the plane of the faces 9a and 9b, which forms a base 9c for the cutout. In the embodiment shown, the cutout 8 opens out radially from the rim of the shoulder 7.

Figure 3:
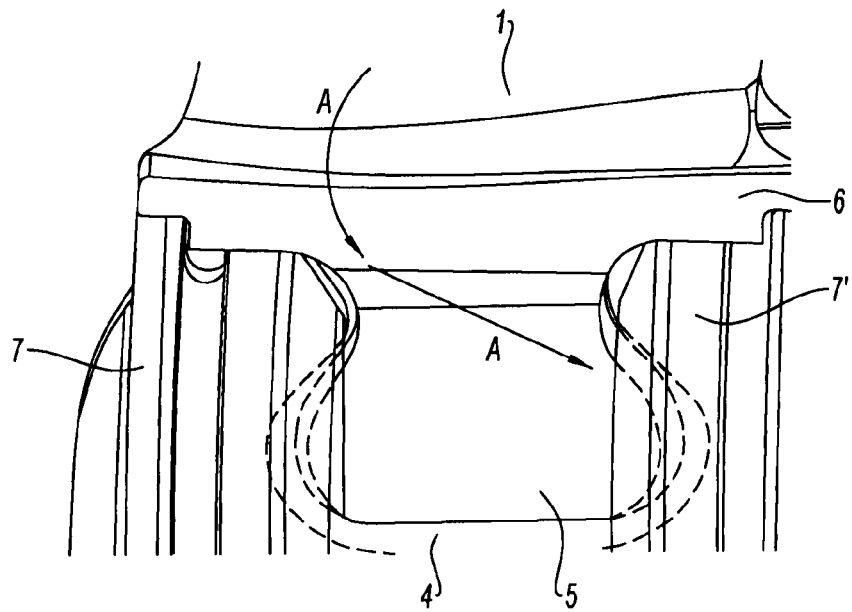
FIG. 3 is a view from the side of a compressor hub capable of receiving a locking device according to an embodiment of the invention, a blade being in position in the peripheral groove of the hub.

With reference to FIG. 3, a blade 1 is seen with its root 5 in place in the peripheral groove 4 recessed from the external face of the hub 3. The platform 6 of the blade bears against the two shoulders 7 and 7' of the external face of the hub, which it covers completely. In the figure is also shown the path A followed by the root 5 of the blade during its insertion into the peripheral groove 4. The root 5 of the blade, in position in the groove 4, has a clearance from the base of the groove which permits part of the lock of the blades to be inserted there, as will be explained further below.

Figure 4:
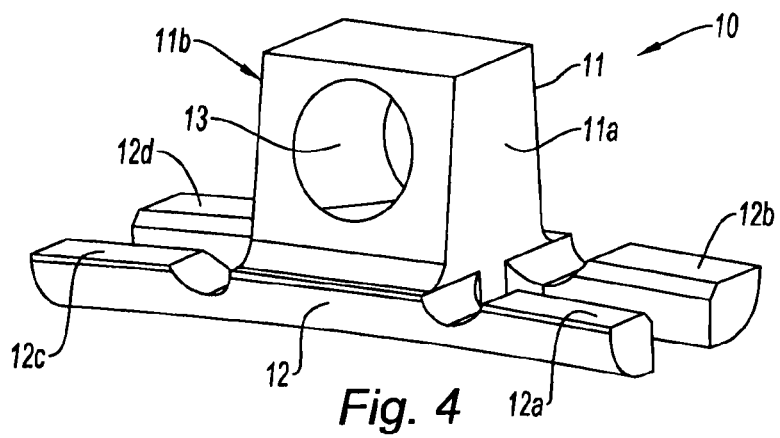
FIG. 4 is a view in perspective of a means for locking in translation for blades mounted in the peripheral groove according to an embodiment of the invention.

In FIG. 4 a lock 10 is shown, forming a means of immobilizing the blades 1 in translation and which has the function of locking the blades in the peripheral groove 4 when they have all been introduced therein. This lock 10 has an upper block 11 of substantially parallelepiped shape, without this shape being imperative, with two lateral walls 11a and 11b designed to cooperate with the lateral faces of the blade roots to serve as a support. It also has a base 12 on which the upper block 11 rests, of which the lower shape is adapted to that of the base of the peripheral groove 4. This base is shown, without it being imperative, in the shape of a support of the upper block which is laterally extended by four segments 12a to 12d, each separate from one another and attached to four lower corners of the upper block 11.

Said segments are planar on their upper face and on their lower face reproduce the shape of the peripheral groove with which they cooperate when the lock is positioned in the bottom of the peripheral groove. The thickness of these segments is less than the clearance existing between the root 5 of the blade 1 and the groove 4 when the blades are positioned in the groove as disclosed in FIG. 3, such that they can rest on the base of the peripheral groove 4 and extend below the roots 5 of the blades 1, in the circumferential direction, without interfering therewith.

The upper block 11 is traversed on both sides, in a direction perpendicular to the principal direction of the segments 12a to 12d, by a first drilled hole 13 located above the region of the base 12 and positioned such that it is located opposite the cutout 8 when the lock 10 is in place in the peripheral groove 4.

Figure 5:
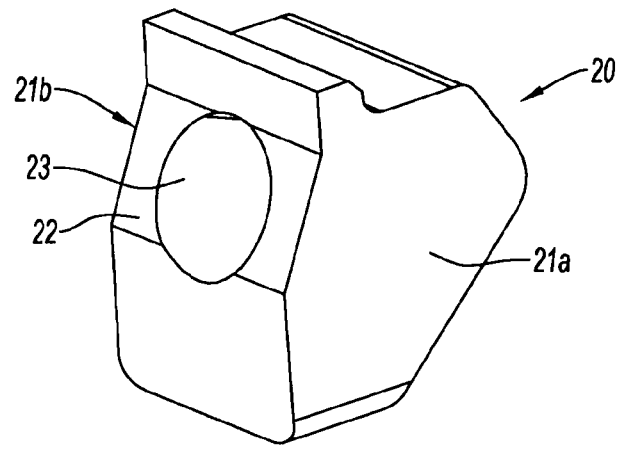
FIG. 5 is a view in perspective of a support of a means for fixing a lock, according to an embodiment of the invention.

FIG. 5 shows a support 20 forming a support for a fixing means (not shown) of the lock 10 and providing the locking in translation thereof, when it is in position in the peripheral groove 4. As shown, the shape of the support, and without this shape being imperative, is entirely the shape of the recessed cutout 8 of the open shoulder 7 of the hub 3. Apart from its function of locking the lock in translation, it is designed to fill the void left by this cutout after the introduction of the set of blades 1 in the peripheral groove 4. It has two planar faces 21a and 21b parallel with one another and which, when it is in position in the open shoulder 7, are parallel to the faces 9a and 9b of the cutout 8. It is also traversed by a second drilled hole 23 of which the axis, after the positioning of the device 20 in the cutout 8 and the lock 10 opposite this cutout, merges with that of the first drilled hole 13 formed in the lock 10. Taking account of this relative arrangement, the fixing means may advantageously be a bolt which traverses the support 20 and the lock 10. The second drilled hole 23 opens out on the external face of the support 20, on a bearing face 22 which forms a planar surface about the second drilled hole 23 and on which the bolt in question bears.

Figure 6:
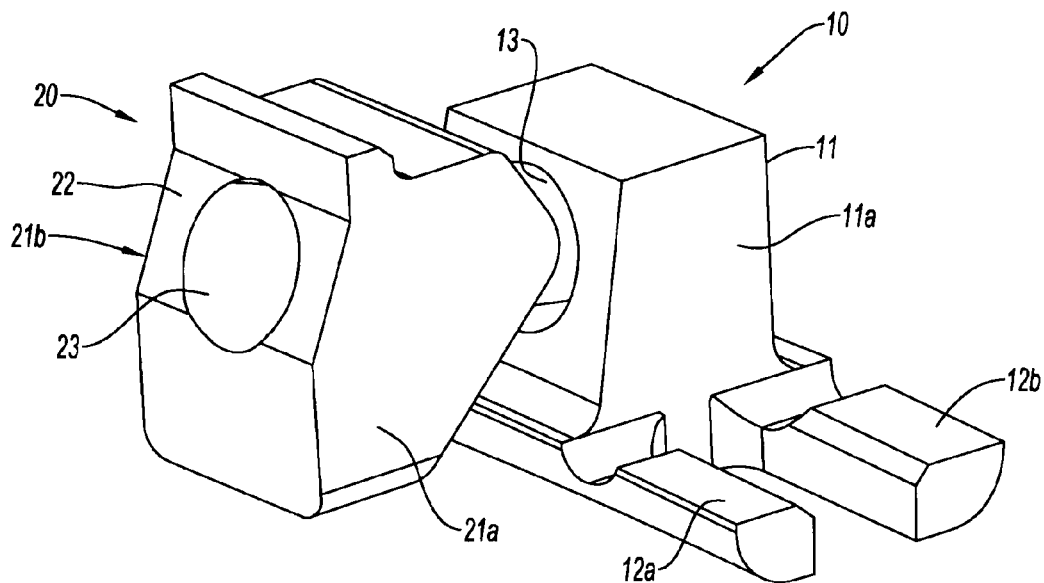
FIG. 6 is a view in perspective of a lock and of the support of its fixing means according to an embodiment of the invention, in their respective relative positions.

FIG. 6 shows the relative position of the lock 10 and the support 20 when they are both in position on the rim of the hub 3. The two drilled holes 13 and 23 have, in this position, colinear axes. A fixing means, such as a bolt, not shown, can pass through the two drilled holes to provide the locking of the lock 10 by the support 20, the possibility of circumferential displacement of the lock being prevented from now on by the cooperation of the faces 21a and 21b of the support 20 with the faces 9a and 9b of the cutout 8.

Figure 7:
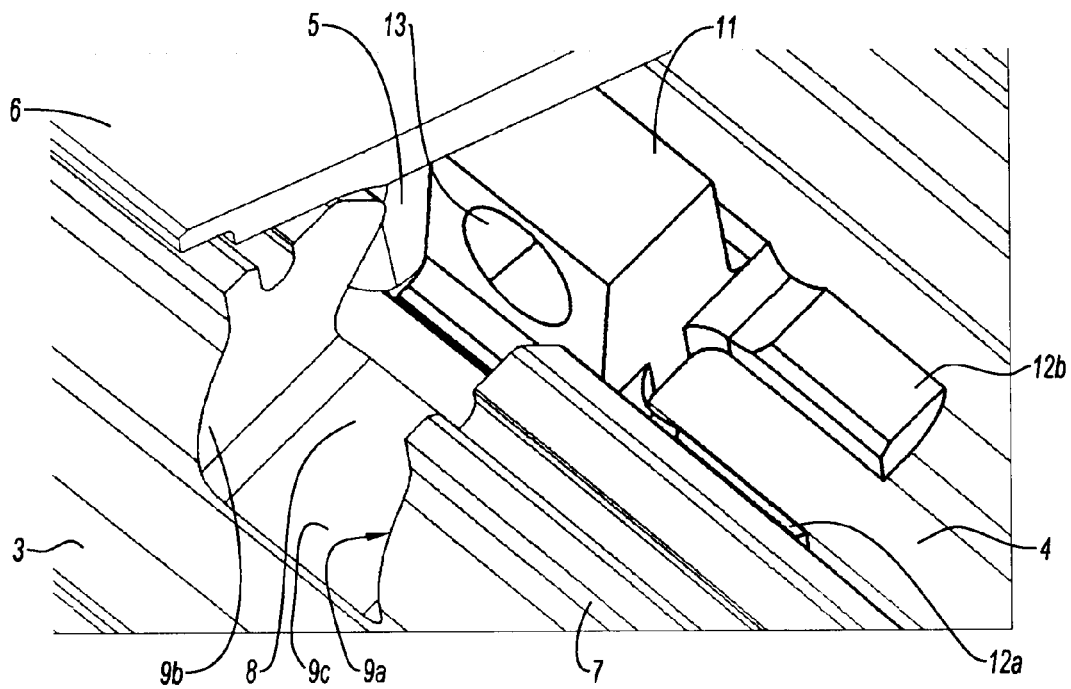
FIG. 7 is a view in perspective of a lock according to an embodiment of the invention, in position below a blade in the peripheral groove of a compressor hub.

FIG. 7 shows the lock 10 in position in the base of the peripheral groove 4 and a blade 1 positioned in said peripheral groove. This figure shows the position in which the lock is located when all the blades 1 are inserted into the peripheral groove 4, but the blade which is symmetrical to the blade shown is not shown for reasons of legibility of the figure. The lock 10 has been positioned opposite the cutout 8 by sliding the assembly consisting of the blades and the lock in the peripheral groove 4. The root 5 of the blade 1 is positioned to bear against a lateral wall 11b of the upper block 11 and covers the segments 12c and 12d of the base 12 of the lock 10. The platform 6 of the blade covers the assembly and rests in abutment against the external face of the hub 3.

The mounting of a set of blades on a compressor hub comprising a cutout using a device for locking the blades in translation will now be disclosed according to an embodiment of the invention.

Each blade 1 is initially shown in an inclined manner, opposite the cutout 8 formed in the open shoulder 7 with the end of its platform 6, which is opposite the cutout, positioned to bear against the shoulder 7' which is not open. By maintaining contact of this end on the shoulder 7', the blade 1 is tilted in the direction indicated by the arrow A of FIG. 3, so as to pass the root 5 between the two faces 9a and 9b of the cutout 8 until the other end of the platform 6 comes, in turn, to bear against the external face of the hub 3, this time in the region of the open shoulder 7.

Once the root 5 of the blade is introduced and the platform 6 rests on the two shoulders of the external face of the hub 3, the blade 1 is free to circulate in the peripheral groove 4 and may be displaced toward the right or toward the left of the cutout, so as to open up said cutout and to make it available for the positioning of a further blade 1. Once all the blades 1 of the set of blades of the stage under consideration, except for two, are positioned, the operator offsets the last blade, for example, to the left, whilst preventing the first-positioned blade, which is now located to the right of the cutout 8, from being positioned in front of the cutout 8. To this end, it is sufficient for the operator to stack the blades against one another and for all the platforms 6 to be brought into contact. The space thus left in front of the cutout 8 permits the lock 10 to be placed in the peripheral groove 4 between the first-positioned and the last-positioned blade. Taking account of the circumferential clearance conventionally existing between the platforms of the blades and of the overall length of the lock which is less than that of the two platforms, the length available in the peripheral groove is sufficient for the lock 10 to be able to be positioned without difficulty.

The operator then turns the assembly consisting of the blades 1 and the lock 10 either in one direction or the other, to offset the upper block 11 of the lock so that it is not positioned opposite the cutout 8. Then the operator inserts the penultimate blade 1 of the set in the peripheral groove 4 in the same manner as for the preceding blades. This operation is made possible by the fact that the radial clearance between the root 5 of the blade 1 and the base of the peripheral groove 4 is greater than the thickness of the segments 12a to 12d; the root of the blade may thus enter the peripheral groove 4 without interfering with these segments. The operator then rotates the set of blades and the lock 10 again, this time in the direction opposite the preceding direction, until the upper block 11 is passed in front of the cutout 8 and the part of the peripheral groove 4 located opposite the cutout 8 is opened up again. The operator then inserts the last blade 1 of the set, as he/she has done for the penultimate blade.

It remains to provide the locking of the set against circular displacements in the peripheral groove 4. To this end, the operator moves back the set until the upper block 11 of the lock 10 is positioned opposite the cutout 8. The operator inserts the support 20 between the two faces 9a and 9b of the cutout 8, in the circumferential extension of the open shoulder 7, then fixes said support 20 to the lock 10 using a fixing means, of the bolt type, provided for this purpose.

The assembly is then locked in rotation in the peripheral groove by the cooperation between the faces 21a and 21b of the device 20 with the faces 9a and 9b of the cutout 8. Subsequently, the lock 10 and its support 20 which are fixed by the bolt-type fixing means are held by the roots 5 of the two last-inserted blades 1, by reacting to the centrifugal force, firstly in the peripheral groove 4 and secondly in the cutout 8: the segments 12a to 12d of the lock, by the action of this force, come to bear against the roots 5 of these two blades which are in turn held by the bearing surfaces of the shoulders 7 and 7' of the rim of the hub 3.

The invention has been disclosed with a support 20 of the lock 10 made in one piece which is detachable from the open shoulder 7, as this support is located in the region of the aperture for the insertion of the blades. As the invention is essentially based on the fact that a device for locking in translation exists which bears on a support connected to one of the shoulders of the hub, it is conceivable to separate the two functions of locking in translation and providing an aperture for the insertion of the blades provided by the support 20 and the cutout 8 in the version disclosed above. The locking may thus be implemented by a simple bore, through which the fixing means passes, which traverses the open shoulder 7 below the platforms of the blades; an aperture for the insertion of the blades is thus positioned at any other location on the circumference of the rim of the hub 3.

Although the invention has been disclosed relative to several particular embodiments, it goes without saying that it comprises all the technical equivalents of the means disclosed, in addition to combinations thereof if they come within the scope of the invention.

The invention claimed is:

1. A locking device designed to permit locking, in a circular fashion, of a set of blades provided with a hammer-type root, on a rim of a turbine engine compressor hub, said rim comprising a peripheral groove on an outer face thereof designed to receive the roots of the blades of said set and two shoulders surrounding said groove of which faces form bearing surfaces for holding said blades, said rim further comprising a cutout formed in at least one of said shoulders to enable the roots of the blades to be inserted in said groove, said device comprising:
   a lock which immobilizes the blades in translation in said groove, said lock being positioned in said groove between first and second consecutive blades and being held in translation in said groove;
   a support; and
   a fixing device,
   wherein said lock includes an upper block with a first planar face abutting said root of said first blade and a second planar face abutting said root of said second blade, and a base which supports the upper block, said base extended by segments with an upper surface which is planar and a lower surface with a shape corresponding to a shape of a base of said peripheral groove,
   wherein said support includes first and second planar faces which are parallel to and abut first and second faces of said cutout and a shape of said support corresponds to a shape of said cutout, and
   wherein a thickness of said segments is less than a radial clearance between said root of said blades and said base of said peripheral groove.

2. The locking device as claimed in claim 1, wherein said lock is shaped so as not to interfere with the blades during installation in the groove, so that the set of blades may be made up of identical blades.

3. The locking device as claimed in claim 1, wherein the support is shaped to be inserted into the cutout in a direction substantially parallel to an axis of the turbine engine.

4. The locking device as claimed in claim 1, wherein the shape of the support is entirely the shape of the cutout formed in the open shoulder.

5. The locking device as claimed in claim 1, wherein the upper block has substantially the shape of a parallelepiped, said first and second planar faces being oriented parallel with an axis of the turbine engine.

6. The locking device as claimed in claim 1, wherein said segments extend tangentially to the groove on both sides of a lower part of the upper block.

7. The locking device as claimed in claim 1, wherein the upper block comprises a first drilled hole and wherein the support comprises a second drilled hole, axes of the two drilled holes being oriented so as to be aligned when the locking device is in position on the hub.

8. The locking device as claimed in claim 7, wherein the fixing device is a bolt passing through the two drilled holes and wherein the support has a bearing face perpendicular to the axis of said bolt.

9. A compressor hub for a turbine engine, designed to carry a set of blades provided with a hammer-type root, the rim of said hub comprising a peripheral groove on the outer face thereof designed to receive the roots of the blades of said set and two shoulders surrounding said groove of which the faces form bearing surfaces for holding said blades, said rim further comprising a cutout formed in at least one of said shoulders to enable the roots of the blades to be inserted in said groove,
   wherein said cutout is shaped to receive the support for holding the lock of a locking device as claimed in claim 1 and said shoulder comprises a cooperating surface for the circumferential bearing of said support.

10. The compressor of a turbine engine comprising at least one hub as claimed in claim 9.

11. A compressor of a turbine engine comprising a set of blades provided with a hammer-type root and a locking device for the blades as claimed in claim 1.

12. A turbine engine comprising a compressor as claimed in claim 11.

13. The locking device as claimed in claim 1, wherein an overall length of said lock is less than an overall length of platforms of said first and second blades.

* * * * *